United States Patent Office 3,347,758
Patented Oct. 17, 1967

3,347,758
ELECTROCHEMICAL PREPARATION OF AROMATIC ESTERS
William J. Koehl, Jr., Yardley, Pa., assignor to Mobil Oil Corporation, a corporation of New York
No Drawing. Filed Sept. 25, 1964, Ser. No. 399,370
18 Claims. (Cl. 204—59)

This invention relates to the electrochemical preparation of acyloxy derivatives of substituted benzene compounds. It provides a convenient and direct one-step method of preparing the derivatives, and is particularly characterized by the good yields obtainable.

The derivatives are of value as intermediates for the preparation of compounds, particularly hydroxy derivatives, which have utility as antioxidants and disinfectants, as lubricating oil additives, in resin manufacture, and the like.

The invention comprises electrolyzing an anhydrous solution comprising the alkyl-substituted benzene compound, an alkanoic acid, an alkali metal salt of the latter, and the anhydride of the acid by passing current from an anode of lead dioxide to a cathode immersed in the solution under the conditions herein described to produce an acyloxy derivative of the said compound, and recovering the same.

In more detail, the substituted benzene compound comprises benzene having a substituent selected from the class consisting of alkyl R—, mononuclear aryl Ar—, alkoxy RO—, phenoxy PhO—, acyloxy RCOO—, and acylamido RCONH—, groups. The preferred substituents are alkyl groups, preferably having up to about 10 or 12 carbons, and more preferably up to 6 carbons, and comprising straight or branched chain radicals. The mononuclear aryl groups are radicals like phenyl, tolyl, and the like. The number of carbons in the alkoxy group may be as described for the alkyl group. In the acyloxy and acylamido groups the R radical may be alkyl, substituted alkyl, phenyl, or substituted phenyl, and the number of carbons in the alkyl or substituted alkyl groups may be as described above. In all of the foregoing substituents, the substituent itself may have a substituting group of the kind described, i.e., an alkyl, mononuclear aryl, alkoxy, phenoxy, acyloxy, or acylamido group.

Specific compounds that may be converted to acyloxy derivatives include such alkyl benzenes as toluene, the xylenes, hemimellitene, pseudocumene, mesitylene, prehnitene, durene, isodurene, pentamethylbenzene, hexamethylbenzene, ethylbenzene, the various diethylbenzenes and polyethylbenzenes, propylbenzene, cumene, cymene, etc.; also alkyl benzenes with substituted alkyl side chains like (2-methoxyethyl)benzene; and phenylbenzene and tolylbenzene; also alkoxybenzenes such as methoxybenzene, ethoxybenzene, phenoxybenzene, etc.; also acyloxy benzenes such as acetoxybenzene and acetoxytoluene; and acylamido benzenes like acetanilide, propionotoluide, etc.

Suitable alkanoic acids are the C–2 to C–10 acids, and preferably the C–2 to C–6 acids such as acetic, propionic, butanoic and pentanoic and their isomers, and the various hexanoic acids. Branched as well as straight chain acids are useful, including such acids as 2-methylbutyric, 3-methylbutyric, and tri-methylacetic. It is preferred to use the acid in an anhydrous state.

The alkali metal salt of the acid is preferably a salt of the acid that is present and preferably too is the sodium or potassium salt, although lithium and quaternary ammonium salts are suitable. It will be understood that the salt may be added per se to the solution or formed in situ as by addition of a base like KOH, NaOH, etc. and reaction of the latter with part of the free carboxylic acid.

The acid anhydride to be used is preferably that of the alkanoic acid which is present. As indicated, the solution to be electrolyzed is an anhydrous one, it being considered that such a solution helps to reduce the formation of by-products. The acid anhydride helps maintain the anhydrous state of the solution. Use of the anhydride in this way is convenient, but it may be omitted if all of the other materials are initially anhydrous. Also, other inert anhydrous solvent materials, such as acetonitrile, may be used instead of the anhydride.

The substituted benzene compound is usually a liquid at the temperatures involved, as is also the alkanoic acid, its salt, and the acid anhydride. The acid and the anhydride together comprise the solvent in which the other components are dissolved. If the anhydride is omitted, the acid alone comprises the solvent; in some cases the solvent may comprise the acid and an added component like acetonitrile. Whatever its composition, the solvent should have suitable solvent action and a suitable dielectric constant.

The composition of the solution to be electrolyzed, in relation to the liquid solvent, is as follows: the amount of substituted benzene compound is 20 to 500, preferably 100 to 300, g./l. of solvent; and the alkanoic acid salt ranges from 20 to 500, preferably 50 to 150, g./l. of solvent. The alkanoic acid may comprise 10 to 100%, preferably 40 to 60%, of the solvent, while the acid anhydride may comprise 90 to 0%, preferably 60 to 40%, of the solvent.

The current density may be maintained over a fairly wide range, say 0.001 to 0.5, and more preferably 0.01 to 0.26, amp./sq. cm. At higher values polyacyloxy derivatives tend to be favored, and mono derivatives at lower values. Generally, 0.09 to 0.10 amp./sq. cm. is suitable for mono and diacyloxy derivatives. As is known, the current density value determines the rate or speed of the electrolysis. Applied voltage is supplied by any suitable D.C. source.

The quantity of electricity passed through the solution is conveniently expressed in terms of faradays per mole of the substituted benzene compound. For example, considering a reaction which involves a change of one electron, a faraday is defined as the amount of electricity which is required to convert one mole of the said compound. In the present work, a faraday is considered to be the product of current and time, and one faraday is equal to 26.8 ampere hours. On this basis, the number of faradays may preferably range from less than 0.5 up to 5 per mole of said compound, it being understood that this quantity of electricity attacks or converts the substituted benzene compound to form acyloxy derivatives. A narrower range is 0.5 to 4 faradays, which is sufficient to form mono- and diacyloxy derivatives, while if the upper limit is extended to 6 faradays, the products may include tri-acyloxy derivatives. The faraday value determines the extent of substitution.

Room temperatures are preferred, e.g., 20 to 30° C., although higher temperatures are useful, going to the boiling point of the solution. If desired, a diaphragm of conventional material may be used to separate the cathode from the anode in order to prevent possible reaction of the products formed at one electrode with those at the other. Agitation is desirable but can be omitted. The pH of the electrolyte solution may initially be on the acid side, or neutral, but preferably is on the acid side, and suitably may range from a pH of 4 to 6, more broadly from 2 to 7.

The anode is lead dioxide, this material having been found to give useful yields of desired product, electricity basis. As illustrated below, it is superior to conventional anodes like platinum and carbon, neither of which, by comparison, is able to give yields of interest.

The cathode may be carbon or graphite or any inert metal such as copper, stainless steel, platinum, silver, nickel, lead, etc. Forms of the electrodes are conventional.

Yields of products are at least 9 or 10%, based on the current. For example, the yield of toluene acetoxylation products may run around 9 to 11%, based on current, these quantities constituting the current efficiency and signifying that 9 to 11% of the total current introduced to the solution actually attacks the toluene and converts the same to acetoxylation products. In the case of xylene, the yields of acetoxy products are over 40%; and with mesitylene, over 50%. Thus, the current efficiency may range above 50%, but in general is at least 9 or 10%. Yields based on the consumption of the substituted benzene compound are at least 80%, although, as will be realized, this basis does not take into account the electricity expended in the process, which in the final analysis is the factor of economic significance since it determines time as well as cost. One or more products may be formed, substitution in the ring and/or the side chain taking place, and as will be described, some control is possible over the character of the product.

As indicated, the product or products are formed at the anode by anodic oxidation. The anolyte may be distilled or fractionated to recover the product, or it may be worked up by crystallization techniques, but preferably the reaction mixture is first diluted with water and then subjected to conventional extraction with a conventional solvent such as ether. Thereafter the extract may suitably be separated by distillation or recrystallization procedures.

In general, by conducting the electrolysis until a minor fraction of the substituted benzene compound is converted, it is found that the predominant product is the monoacyloxy derivative. Continuation of the electrolysis until half to three-fourths of the said compound is converted produces both the monoacyloxy and the diacyloxy derivatives in good yields. Further progress of the electrolysis, using larger quantities of electricity, results in the formation of higher derivatives. It is possible to produce substantially only the mono derivative by initially converting only a minor fraction of the said compound, then removing the formed mono product from the solution, continuing the conversion and removing mono product, and proceeding in this way until substantially all of the said compound is converted to mono derivative.

It is convenient to refer to the electrolysis of an illustrative material such as toluene and specifically to the acetoxylation thereof. In order to make monoacetoxy derivatives substantially free from higher derivatives, it is preferred to pass up to about 1.3 faradays of electricity through the solution, this amount being regarded on the basis that it all goes to attack and convert the toluene to acetoxylation products. After such amount of electricity has been so used, the electrolysis may be stopped, the derivative or derivatives removed from the reaction mixture, the unreacted toluene put back into the solution, and the electrolysis continued. By repeating the foregoing steps, an ultimate yield of mono derivatives of up to about 90% by weight, based on toluene, may be obtained.

A mixture of mono and di derivatives is obtainable over a range of about 1.5 to 4.0 faradays, the basis of the latter being as noted in the preceding paragraph. At 1.5 faradays the mixture is preponderantly mono; at about 3.0 faradays the proportions of mono and di tend to be approximately equal; and at 4 faradays the concentration of di in the mixture is favored.

The yield of the diacetate may be substantially increased by operating at 3.0 to 4.0 faradays, basis noted, to form a reaction mixture containing both mono and di derivatives, stopping the electrolysis to remove the diacetate, returning to the solution the unreacted toluene and the mono derivative, and continuing the electrolysis until substantially all of the latter compounds are converted to diacetate.

Another method of forming the diacetate derivative is to use only the mono derivative as the starting material. This procedure is simpler to the extent that one component, the starting toluene, is eliminated from the reaction mixture.

By increasing the amount of electricity, higher derivatives may be formed. Thus, when up to 5 or 6 faradays attack the toluene, di- and triacetates may form.

Another method of controlling the selectivity of the product comprises varying the alkali metal salt concentration. Thus, by keeping the concentration of sodium acetate at the lower portion of the concentration range, say about 20 g./l. of solvent, or even less, going down to 5 g./l., the formation of diacetate may be substantially suppressed in favor of the monoacetate. Conversely, the formation of the di derivative may be increased over the mono by keeping the sodium acetate concentration at the upper portion of the concentration range.

It will be understood that other acyloxy derivatives of toluene may be formed according to the foregoing procedures, and that the latter apply to the other described substituted benzene compounds. In general, other acyloxy derivatives that may be formed are the propionates, butyrates, isobutyrates, valerates, and caprylates.

The invention may be illustrated by the following examples.

Example 1

Toluene was acetoxylated in several different cells, described below as A, B, and C, using anodes of lead dioxide, and for comparison, of carbon and platinum.

Cell A consisted of a one liter vessel fitted with a stirrer, thermometer, reflux condenser, cooling bath and an electrode assembly. The latter comprised four 1 x 32 x 115 mm. copper plates, and three 6.5 x 32 x 115 mm. lead dioxide plates prepared by plating lead dioxide from a lead nitrite solution onto carbon plates. The copper plates were stacked alternately with the lead dioxide plates and held together by two Teflon rods which passed through all seven pieces. Teflon washers on the rods maintained 4 mm. spaces between the plates. This assembly was mounted vertically in the cell. The lead dioxide plates were connected together as the anode and the copper plates as the cathode.

Cell B consisted of a cylindrical glass vessel 5.0 cm. in diameter and 15 cm. in height fitted with a reflux condenser and a thermometer. The cathode was a copper cylinder 3.0 cm. in diameter and 5.0 cm. in height which was concentric with an anode comprising lead dioxide prepared by plating lead dioxide from a lead nitrate solution onto a ¼ in. carbon rod. The contents of the cell were stirred by rotating the anode at about 2500 r.p.m.

Cell C was a 3.0 cm. diameter glass cylinder of about 100 ml. capacity fitted with a reflux condenser, thermometer, magnetic stirrer and two 1.5 x 3.6 cm. platinum foil electrodes mounted parallel and spaced 0.6 cm. apart.

The results are summarized in Table 1. In each run, a solution of 25 ml. of toluene and 12 g. of anhydrous sodium acetate in 60 ml. of glacial acetic acid and 60 ml. of acetic anhydride was electrolyzed at a current density of 0.05 amp./sq. cm. and an applied voltage of 20 to 25 volts at 50 to 70° C. For runs Nos. 5 and 6, the lead dioxide anode of Cell B was replaced by an anode comprising a ¼ inch diameter carbon rod previously cleaned in hot nitric acid solution.

TABLE 1.—ACETOXYLATION OF TOLUENE

| Run | Anode | Cell | Current Efficiency for Acetates, Percent | Products, Area Percent | | | | |
|---|---|---|---|---|---|---|---|---|
| | | | | Xylene | o-Tolyl Acetate | p-Tolyl and Benzyl Acetate | Xylyl Acetate | Diacetates |
| 1 | PbO$_2$ | B | 10 | 5 | 25 | 52 | 8 | 10 |
| 2 | PbO$_2$ | A | 11 | 9 | 15 | 55 | 14 | 7 |
| 3 | PbO$_2$ (air) | B | 9 | 8 | 16 | 48 | 20 | 7 |
| 4 | PbO$_2$ | B | 9 | 8 | 12 | 49 | 24 | 6 |
| 5 | C | B | 5 | 33 | 6 | 37 | 15 | 11 |
| 6 | C (air) | B | 5 | 33 | 6 | 40 | 14 | 8 |
| 7 | Pt | C | <1 | 30 | 15 | 43 | 6 | 7 |

As will be seen from the table, the highest current efficiency for acetates was 10 to 11%, obtained with anodes of lead dioxide. The current efficiency is the yield based on the total current; thus, for run No. 1, the current efficiency of 10% means that 10% of the total current was used up in converting toluene to the various acetate products noted, while the balance of the current was used up in attacking compounds like sodium acetate to produce gaseous products like ethane and carbon dioxide, the gaseous products not being listed on the table. It is apparent from run No. 1 that the yield of acetate products, i.e., the current efficiency, was almost twice that of run Nos. 5 or 6, where a carbon anode was used, and more than ten times that of run No. 7, where the anode was platinum. The liquid cell mixture of electroylte was analyzed by means of gas chromatography, in which procedure the various products give rise to peaks on a graph. The amount of a given product was determined by estimating the area under its peak, then estimating the total area under all the peaks, and then calculating the proportion of the total area which is represented by the area of the given peak, this proportion being noted in the table under the heading Products, Area percent. (The latter value, it may be noted, is pretty close to the weight percentage.) On this basis, the total liquid products comprised 5% xylene, 25% o-tolyl acetate, 52% of a mixture of p-tolyl acetate and benzyl acetate, 8% of xylyl acetate, and 10% of products identified as diacetates. The xylene, which is a mixture of isomers, is undesirable, and as is apparent the lead dioxide anode gave the smallest amount of this material. The diacetates, while useful, are more preferably made by acetoxylating the monoacetate. In some runs (Nos. 3 and 6) air was bubbled into the solution around the anode, which fact is noted in the table, and it will be seen that the differences between runs with and without air are not large.

*Example 2*

Para-xylene was acetoxylated, using the reaction conditions of Example 1. The cells and anodes, together with the results, are shown in Table 2. The main products were two monoacetates; 2,5-DPA or 2,5-dimethylphenyl acetate, and 4-MBA or 4-methylbenzyl acetate, and as is apparent, they were obtained in superior yields at lead dioxide. Mesitylene and other compounds were formed at the carbon and platinum anodes but not at lead dioxide.

TABLE 2.—ACETOXYLATION OF p-XYLENE

| Run | Anode | Cell | Current Efficiency for Acetates, Percent | Products, Area Percent | | | |
|---|---|---|---|---|---|---|---|
| | | | | Mesitylene | 2,5-DPA | 4-MBA | Others |
| 1 | PbO$_2$ | B | 44 | 0 | 51 | 49 | Trace |
| 2 | PbO$_2$ (air) | B | 51 | 0 | 51 | 49 | Trace |
| 3 | C | B | 15 | 2 | 36 | 47 | 15 |
| 4 | C (air) | B | 13 | 2 | 39 | 46 | 13 |
| 5 | Pt | C | 11 | 12 | 40 | 43 | 5 |

*Example 3*

Mesitylene was acetoxylated at a lead dioxide anode in Cell B, using the conditions described in Example 1 for this anode and this cell. The products comprised 82% of 2,4,6-trimethylphenyl acetate, 7% of 3,5-dimethylbenzyl acetate, and 10% of a material considered to be a diacetate. The current efficiency was 52%.

*Example 4*

Phenylether (Ph-O-Ph) in an amount of 30.5 g. was mixed with 12 g. of sodium acetate, 60 ml. of acetic acid and 60 ml. of acetic anhydride and the anhydrous solution placed in a cell (Cell B) having an anode of lead dioxide and a cathode comprising a cylinder of platinum gauze. The solution was electrolyzed over a period of 8 hours at a temperature that was progressively increased from 50 to 75° C., an applied voltage of 23 to 25 volts, and a current of about 0.7 amp. (The current is the product of the current density in amp./sq. cm. times the anode area in sq. cm.) After the electrolysis the cell contents were diluted with water and extracted with diethyl ether. After evaporation of the diethyl ether, 31.3 g. of a yellow liquid remained which was identified by gas chromatography as containing a monoacetate of phenylether and unreacted phenyl ether. Considering the product as comprising the monoacetate entirely, the yield was about 43% based on the current.

The foregoing run was repeated, except that 24 g. of sodium acetate were used and about twice the current. This electrolysis was carried out for 8 hours at a progressively increasing temperature in the range of 55 to 111° C., an applied voltage of 21 to 25 volts, and at a current which for the greater part of the run was in the range of 1.2 to 1.5 amps. Following the electrolysis, work-up of the cell liquid resulted in the identification of two monoacetate products, namely, 2-phenoxyphenyl acetate and a larger amount of 4-phenoxyphenyl acetate, the identification being made by first hydrolyzing each compound to from 2-phenoxyphenol and 4-phenoxyphenol, respectively, and identifying the latter compounds. Ratio of the 2- and 4-isomers of acetate was 2:3.

In other experiments, p-tolyl acetate was subjected to the same anodic acetoxylation conditions as toluene using a lead dioxide anode. Analysis by gas chromatography showed some diacetate products including one in which the side chain as well as the ring was acetoxylated.

If desired, the anode may be subjected to an ultrasonic field for the purpose of maintaining its surfaces free of any deposits.

As indicated, in the acetoxylation reaction, the mixture of acetic acid and acetic anhydride is considered to function as a solvent for the other components of the solution and also for various products of electrolysis. Another useful material in place of the anhydride is anhydrous acetonitrile, which may be used in the same amounts as the anhydride. A less preferred solvent is dimethylformamide, which has suitable solvent properties but which leads to excessive methane and carbon dioxide formation. In general, any solvent or solvent mixture may be used, and in the amounts described, which dissolves the reactants and provides suitable conductivity, and which of course does not itself undergo reaction, i.e., has a sufficiently high oxidation potential as to be stable at the anode. Whatever solvent is employed, it is desirable to avoid the presence of water, which may undergo electrolysis and which usually results in darkly colored reaction mixtures.

Considering further the substituted benzene compounds that are anodically oxidized, it may be noted that they are substantially chemically inert during the electrolysis. The substituent groups survive the action of the current, although in some cases groups like alkyl are substituted by an acyloxy group, as in the case of toluene being converted to benzyl acetate. These substituent groups are connected to the benzene ring through an element having an atomic number of 6 to 8, i.e., carbon, nitrogen, and oxygen. To be avoided are substituted benzenes having substituents like nitro, cyano, hydroxy, amino, chloro, bromo and the like.

It will be understood that the invention is capable of obvious variations without departing from its scope.

In the light of the foregoing description, the following is claimed.

1. Method for the electrochemical preparation of a monoacyloxy derivative of a substituted benzene compound which comprises electrolyzing an anhydrous solution comprising said compound, an alkanoic acid, an alkali metal salt of an alkanoic acid, and an alkanoic acid anhydride by passing up to 1.3 faradays of electricity per mole of said compound through said solution from an anode of lead dioxide to a cathode to convert said compound to a monoacyloxy derivative, said compound comprising benzene having a substituent selected from the class consisting of alkyl, mononuclear aryl, alkoxy, mononuclear aryloxy, acyloxy, and acylamido groups, said quantity of electricity being used up to attack said compound and convert the same to said derivative, said derivative being substantially the only acyloxy derivative that is formed, then ceasing the electrolysis, and removing said derivative from the solution.

2. The method of claim 1 wherein, after said derivative is removed from the solution, the electrolysis is continued to convert unreacted substituted benzene compound, and wherein said derivative-removal and electrolysis-continuing steps are repeated to produce a yield of said derivative of up to about 90% by weight based on said compound.

3. Method for the electrochemical preparation of mono and diacyloxy derivatives of a substituted benzene compound which comprises electrolyzing an anhydrous solution comprising said compounds, an alkanoic acid, an alkali metal salt of an alkanoic acid, and an alkanoic acid anhydride by passing about 1.5 to 4.0 faradays of electricity per mole of said compound through said solution from an anode of lead dioxide to a cathode to convert said compound to said mono and di derivatives, said compound comprising benzene having a substituent selected from the class consisting of alkyl, mononuclear aryl, alkoxy, mononuclear aryloxy, acyloxy, and acylamino groups, said quantity of electricity being used up to attack said compound and convert the same to said derivatives, then ceasing the electrolysis, and removing said derivatives from the solution.

4. Method of claim 3, wherein the preparation of said diacyloxy derivative is favored by passing 3.0 to 4.0 faradays of electricity per mole of said compound through the solution.

5. Method for the electrochemical preparation of a diacyloxy derivative of a substituted benzene compound which comprises electrolyzing an anhydrous solution comprising a monoacyloxy derivative of said compound, an alkanoic acid, and an alkali metal salt and an anhydride of said acid by passing 1.5 to 4.0 faradays of electricity per mole of said monoacyloxy derivative through said solution from an anode of lead dioxide to a cathode to convert said mono derivative to a diacyloxy derivative, said compound comprising benzene having a substituent selected from the class consisting of alkyl, mononuclear aryl, alkoxy, mononuclear aryloxy, acyloxy, and acylamido groups, said quantity of electricity being used to attack said mono derivative, then ceasing the electrolysis, and removing said diacyloxy derivative from the solution.

6. Method for the electrochemical preparation of an acyloxy derivative of a substituted benzene compound in good yield which comprises preparing an anhydrous solution of said compound and a salt of an alkanoic acid in a solvent comprising an alkanoic acid, passing through the solution from an anode of lead dioxide to a cathode 0.5 to 6 faradays of electricity per mole of said compound to form an acyloxy derivative of said compound, said compound comprising benzene having a substituent selected from the class consisting of alkyl, mononuclear aryl, alkoxy, mononuclear aryloxy, acyloxy and acylamido groups, said quantity of electricity being used up to attack said compound and convert the same to said derivative, and recovering the derivative.

7. Method of claim 6 wherein said alkanoic acid has 2 to 6 carbon atoms.

8. Method of claim 6 wherein said salt is the salt of said acid.

9. The method of claim 6 wherein said substituent is an alkyl group.

10. The method of claim 6 wherein said substituent is and alkoxy group.

11. The method of claim 6 wherein said substituent is a mononuclear aryl group.

12. The method of claim 6 wherein said substituent is a mononuclear aryloxy group.

13. The method of claim 6 wherein said substituent is a group having an acyl linkage.

14. Method for the electrochemical preparation of an acyloxy derivative of a substituted benzene compound in good yield which comprises preparing an anhydrous solution comprising, per liter of a solvent comprising an alkanoic acid, 20 to 500 g. of said compound and 20 to 500 g. of an alkali metal salt of said alkanoic acid, passing electricity through said solution from an anode of lead dioxide to a cathode at a current density of 0.001 to 0.5 amp./sq. cm., thereby to form an acyloxy derivative of said compound, said compound comprising benzene having a substituent selected from the class consisting of alkyl, mononuclear aryl, alkoxy, mononuclear aryloxy, acyloxy, and acylamido groups, said quantity of electricity being used up to attach said compound and convert the same to said derivative, and recovering the derivative.

15. Method of claim 14 wherein said alkanoic acid has 2 to 6 carbon atoms.

16. Method of claim 14 wherein said solvent comprises a mixture of said alkanoic acid and an anyhdride of said acid.

17. Method of claim 16 wherein said anhydride is the anhydride of said acid and said salt is the salt of said acid.

18. Method of claim 16 wherein said compound is an alkyl-substituted benzene, said alkanoic acid is acetic acid, said salt is an alkali metal acetate, and said anhydride is acetic anhydride.

References Cited

UNITED STATES PATENTS 2,680,713  6/1954  Lindsey et al. _____ 204—59

HOWARD S. WILLIAMS, *Primary Examiner.*